Figure 1:
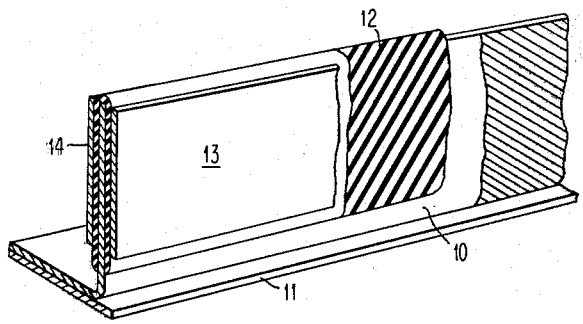

June 15, 1965    E. J. RYMASZEWSKI ETAL    3,189,847
D.C. POWER DISTRIBUTION SYSTEM
Filed May 29, 1961

INVENTORS
EUGENE J. RYMASZEWSKI
IACOB RISEMAN
LESLIE A. HARLOW
BY
Wesley De Bruin
ATTORNEY

United States Patent Office 3,189,847
Patented June 15, 1965

3,189,847
D.C. POWER DISTRIBUTION SYSTEM
Eugene J. Rymaszewski and Jacob Riseman, Poughkeepsie, and Leslie A. Harlow, Fishkill, N.Y., assignors to International Business Machines Corporation, New York, N.Y., a corporation of New York
Filed May 29, 1961, Ser. No. 113,516
12 Claims. (Cl. 333—1)

This invention relates to power distribution systems and, more particularly, to systems employing strip transmission lines for distributing energy to a plurality of circuits or components.

It is well known in the art that a transmission line, in its most simple form, may comprise two spaced, parallel conductors for coupling energy from a power supply to a utilizing circuit. A more refined example of such a transmitting medium is coaxial cable which is ordinarily employed to couple high frequency electronic energy between electronic circuits, due to the efficiency of the cable in conducting the energy with minimum power loss. When direct current or low frequency alternating current energy is being conducted, the regulation of the power supply voltage is affected only by the ohmic parameters of the conductors and, as a result, the transmitting medium may have low resonance attenuating characteristics.

However, there are occasions when the transmission line is required to have high attenuation characteristics. For example, it is often necessary to supply a fraction of the energy being conducted by a primary cable to a plurality of circuits without introducing disturbing influences into the utilizing circuitry. These disturbances occur, as is well known, when the frequency of the alternating current components of the transmitted energy increases into the range of the lower microwave frequencies, so that the geometric length of the conductors of the transmitting medium becomes comparable to the wave length of the high frequency components. When the geometric length of the medium is equal to one-quarter the wave length of the alternating current components or an odd multiple thereof, the disturbing influences are introduced into the circuitry as current is drawn from the primary transmitting medium by one of the circuits. Effectively, a parallel resonant circuit, comprising an inductance, a capacitor and a resistor, is established between the conductors of the medium at the point of coupling to the circuit, contributing to the total effective impedance of the power supply. Sinusoidal oscillations, which are more commonly referred to as ringing, are established in the power supply voltage, interfering with the other circuits thereby affecting their operation. As a result, coaxial cable having characteristics for attenuating this ringing has been developed. One example of such a cable is disclosed in U.S. Patent 2,622,152, issued in the name of Samuel J. Rosch on December 16, 1952.

Although coaxial cable having high attenuation characteristics has many and varied usages, it is not feasible to employ it in distributing energy from a source to a plurality of circuits and components of the type ordinarily found in a large scale, high speed computing machine employing printed circuits. In these machines, the circuits and components are of miniature size, and, ordinarily, the space allotted for power distributing equipment is at a premium. Moreover, these machines employ closely spaced, high speed switching circuits which operate at low signal levels and thus are more severely affected by the resonant components of the energy being distributed.

Consequently, strip-type transmission lines are employed for conducting the energy from the source to the circuits or components. In order to decouple the several utilizing circuits, these arrangements have included means, such as feed-through capacitors connected across the line, for increasing the capacitance of the line. Reduction of the characteristic impedance of the line takes place to effect a reduction in the amplitude of a disturbing resonant signal. Although the desired decoupling of the circuit is accomplished, the mounting and servicing problems encountered in the use of these capacitors offsets the advantages obtained, and, therefore, the desirability of their use is questionable.

Accordingly, it is a primary object of the invention to provide a simplified energy distributing system which decouples the circuits by reducing the amplitude of any disturbing resonant signal, as well as by attenuating this signal.

It is another object of the invention to provide such a system which is capable of supplying a single level of energy or a plurality of levels of energy.

A further object of the invention is to provide a mechanically rigid power distribution arrangement which employs strip transmission lines and has inherent provision for high attenuation of the high frequency alternating current components of the distributed power.

Still a further object of the invention is to provide a power distributing arrangement which may be utilized with conventional printed circuit boards for distributing power to a plurality of components and circuits associated with the printed circuit board and which acts as a heat sink for the heat generated by these components.

In accordance with an aspect of the invention, there is provided a mechanically rigid transmission line having inherent alternating current decoupling characteristics for distributing power from a source to a plurality of units. A ground substratum, which has a thickness sufficient to render the line rigid, a lossy dielectric, and means for conducting the power comprise the elements of the line. The dielectric is affixed to at least a portion of the substratum's surface, and the conducting means is applied to the dielectric, so that energy may be conducted by the line for distribution to the units in a manner, such that the attenuation in the line increases as the frequency of the alternating current components of the energy being conducted increases.

The foregoing and other objects, features and advantages of the invention will be apparent from the following more particular description of a preferred embodiment of the invention as illustrated in the accompanying drawing.

Figure 2:
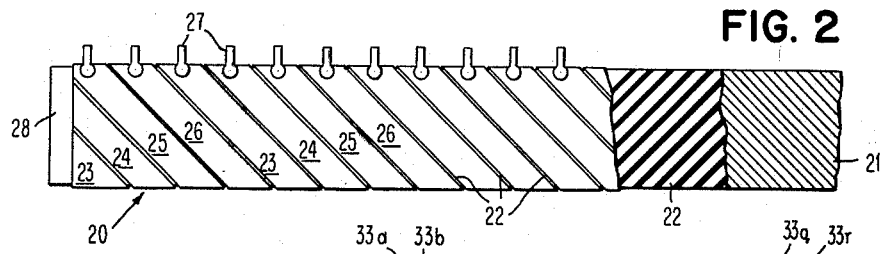
Figure 3:
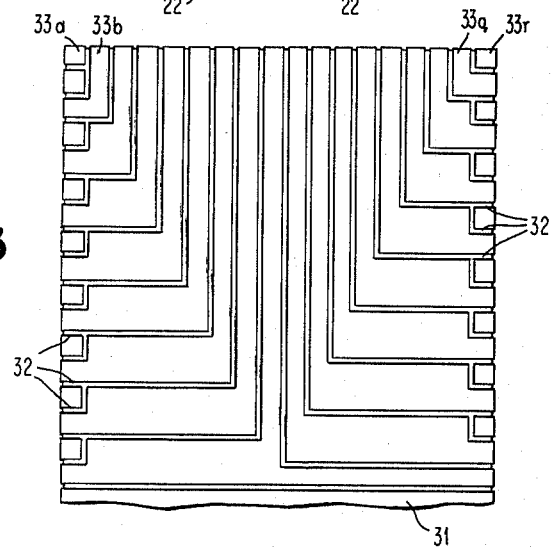
Figure 4:
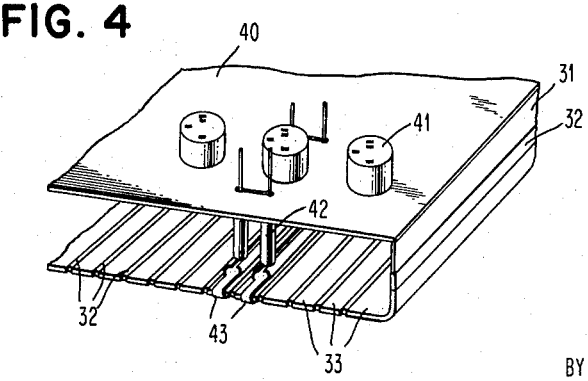

In the drawing:
FIG. 1 is perspective view partially in section, of one form of the energy distributing system of the invention which conducts either one or two voltage levels;
FIG. 2 is a side plan view partially in section of a second form of the system of the invention which provides for the distribution of a plurality of individual levels of voltage;
FIG. 3 is a plan view of an energy distributing arrangement incorporating the features of the invention for use with a printed circuit board; and,
FIG. 4 is a perspective view of the distributing arrangement of FIG. 3 as utilized with a conventional printed circuit board.

Referring now to FIG. 1, the energy transmitting line of the invention, in its most simple form, comprises a ground plane 10 which is L-shaped and affixed at its base to a ground lead 11. A dielectric 12 is applied to either side of the vertical portion of ground plane 10 and conductive strips 13—14 are applied to either side of the dielectric. The ground plane provides the mechanical rigidity for the entire structure, and, therefore, it is obvious that its thickness should be sufficient to support the entire transmitting line. Although such a thickness is readily ascertainable by one skilled in the art, for illustrative purposes it may be stated that a ground plane having a thickness of approximately .020 inch has been found to provide ample mechanical rigidity for the structure.

Ground plane 10 is preferably formed of a ferro-magnetic material having the property of being highly conductive when direct current energy is being transmitted, or, when subjected to the low frequency alternating current (A.C.) components of this energy. However, the conductivity of the material should also be an inverse function of the frequency of the A.C. components, so that, as the frequency of these components increases, the conductivity decreases. These properties of the ferromagnetic material act to significantly amplify the skin effect of the transmission line as the frequency of the A.C. energy components increases, and thus, to increase the attenuating characteristics.

Steel is an example of one such material possessing the required ferromagnetic properties, as well as mechanical rigidity. Any type of steel may be employed provided it is a magnetic alloy, since it has been found that the carbon and ferrous composition of the material has no bearing on the occurrence of these properties.

As previously mentioned, a parallel resonant circuit is effectively established, across the conductors of a transmission line at the point of coupling to a circuit, when the circuit draws current. This resonant circuit produces a disturbing signal which can seriously affect the operation of closely adjacent circuits. For this reason, the dielectric material 12, which is applied only to the vertical portion of the ground plane 10, is required to be lossy. As such, for the high frequency A.C. energy components distributed by the transmission line, the shunting conductance of the line changes. The conductance increases as the component frequency increases, so that any disturbing signal generated due to the resonant circuit behavior of the line is substantially reduced in amplitude. Moreover, the attenuating properties of the line are increased and the disturbing signal has little effect on the closely adjacent circuits.

One illustration of a dielectric material that satisfies these requirements is a composition of ground glass and a small percentage of titanium dioxide. The glass frit composition may be sprayed on the ground plane and thereafter baked to form an enamel. The glass particles give the lossy characteristic to the dielectric material, and have a dielectric constant in the range of 3.5 to 15 at one megacycle frequency, whereas, the titanium dioxide serves to increase the capacitance of the line, thereby reducing its characteristic impedance.

The thickness of the dielectric material 12 applied to ground plane 10 is in the range of .001 to .005 inch in order to prevent short circuits between the inner and outer conductors 10 and 13, respectively. Additionally, if the thickness of the dielectric is in this range, the described effect on characteristic impedance of the line is achieved.

It should be understood, however, that the greater the lossiness of the dielectric material, the greater is the attenuation of any disturbing signals. Therefore, if the dielectric is sufficiently lossy, the ground plane 10 need not be formed by ferromagnetic material and any metallic material could be employed. In like manner, the property of dielectric lossiness may be increased as well as regulated by suspending metallic particles in the glass. Of course, these particles should be isolated from each other to prevent short circuits between the conductors.

As shown in FIG. 1, the outer conductors 13—14 are dielectrically separated from the ground plane and from each other by the lossy dielectric material 12, and, therefore, the distribution system of the invention is capable of carrying a first voltage level on the conductor 13 and a second level on the conductor 14. In this manner, components, such as electrical resistors, may be directly fused to the conducting portion of the line. In such an arrangement, the base portion of ground plane 10 along with the ground lead 11 may be suitably secured to a printed circuit board, and the components would be connected directly from a printed circuit for fusion to the energy distributing system. It should be understood, however, that the base portion of the ground plane 10 and the ground lead 11 may be eliminated, so that the ground plane is a single plane element with a ground plane connection. The distribution system could then be utilized for carrying energy from a source directly to a circuit without any intermediate tap-off or connection to a component.

The strip conductors 13—14 applied to the dielectric material 12 may be formed of a fired-on silver composition having a gold plate. A more practical type of conducting element would be copper conductors applied to the dielectric material by conventional printed wiring technologies. It should also be noted that the ferromagnetic material described above may also be employed for the conductors 13—14 to increase the attenuating properties of the transmission line. The ferromagnetic material, e.g., nickel, cobalt or iron, could be deposited on the dielectric material 12 by evaporation processes, and, thereafter, this surface could be copper plated to enhance the direct current conductivity of the transmission line. It is obvious, of course, that these methods are given only by way of illustration. Suitable conductors may be applied to the dielectric material by any of the many and varied methods known in the art.

Referring now to FIG. 2, a second form of transmission line 20 comprises a ground plane 21 of ferromagnetic material, a lossy dielectric 22 and a plurality of conducting bands spirally wound around the dielectric material. Both the ferromagnetic ground plane and the dielectric possess the same attributes as described for the embodiment of FIG. 1. The conductive strips may be silk screened on the dielectric material, or applied by the methods described above.

As shown, the conductive strips are four in number 23, 24, 25 and 26 permitting four separate and distinct voltage levels to be carried by the transmission line. Each of the conductive strips repeats itself on each fourth spiral around the line. It is to be understood, however, that any number of individual conducting strips may be employed in this manner by spirally winding the individual strips around the dielectric.

Tap-off of a given voltage for feeding to a particular circuit or component may be accomplished by providing contacts 27 along a common edge of the transmission line. Connection to a ground reference voltage may be accomplished by providing a suitable contact 28 at the end of the ferromagnetic ground plate 21.

Referring to FIG. 3, the features of this invention may be incorporated in an energy distribution system for a printed circuit board. In this arrangement, eighteen individual voltage levels may be applied to the energy distributing system. The ground plane is indicated at 31 and the lossy dielectric, which is baked on the ground plane, at 32. The conductive strips 33a–33r may be individually silk screened on the dielectric, so that each of the strips is insulated by the dielectric from each other and from the ground plane.

In FIG. 4, the arrangement of FIG. 3 is shown for use with a printed circuit board. The printed circuit board 40 is of standard configuration utilizing standard components, such as the component sockets 41 and the resistors 42. The printed circuit board 40 may be supported in spaced relation with the distribution system by an extension of the system's ground plane (as shown in FIG. 4) or suitable mounting means may be employed. In this manner, the components, such as the resistors, may be fused directly to the individual conducting strips or they may be carried, as shown in FIG. 4, in suitable conducting elements 43 which are, in turn, affixed to the conducting strips.

In addition to being self-supporting, the energy distribution system of the invention also acts as a heat sink for the heat which is developed by the components, such as the resistors in FIG. 4, and, therefore, it is preferred that the thermal coefficients of expansion of the ground plane material and the dielectric material are matched to prevent any strains from occurring in the dielectric material. By maintaining the dielectric material within the thickness range described above, the heat path has a low thermal resistivity permitting the heat to be conducted to the ground plane which acts as the heat sink.

In operation, the distribution system in any of the above-described embodiments conducts one or more voltage levels. If the voltage being conducted is D.C. or has low frequency A.C. components, the transmission line operates as a normal, very low loss transmission line. However, if there are high frequency components present, greater resistivity takes place in the ferromagnetic ground plane, and the characteristic impedance of the line decreases due to the increase in the conductance of the lossy dielectric material. The attenuation properties of the line are substantially increased decoupling any spurious interference from one circuit to another, thus avoiding premature and unwanted switching in these circuits. In addition to providing the above-described advantages, it is obvious that the transmission line avoids the use of cumbersome and space-consuming cable arrangements for supplying power to a plurality of circuits and components.

While the invention has been particularly shown and described with reference to a preferred embodiment thereof, it will be understood by those skilled in the art that various changes in form and details may be made therein without departing from the spirit and scope of the invention.

What is claimed is:

1. An energy distribution system having inherent decoupling characteristics for reducing the amplitude and attenuating the high frequency resonant signal components of the energy distributed by said system from a source to a plurality of units, comprising a conductive substratum for serving as a ground plane for said system, a lossy dielectric affixed to at least a portion of said substratum for increasing the conductance of said system to decrease the characteristic impedance of said system as the frequency of the resonant components increases, and means affixed to at least a portion of said dielectric for conducting said energy from said source for distribution to said units, said substratum being characterized by being formed of ferromagnetic material having the properties of being conductive when direct current energy is conducted and when subjected to the low frequency alternating current components of said energy so that attenuation of the high frequency alternating current components is provided the loss angle of the dielectric being equal to or greater than the loss angle of the conductive substratum and the means for conducting.

2. The system of claim 1, wherein said means for conducting said energy are formed of said ferromagnetic material, so that attenuation of the high frequency alternating current components is provided.

3. A transmission line for distributing energy from a source to a plurality of units, said line having high inherent decoupling characteristics for attenuating the high frequency resonant signal components of said energy, comprising a substratum for serving as a ground plane for said line and of a thickness sufficient to support said line, a dielectric affixed to at least a portion of said substratum, and means affixed to said dielectric for conducting said energy from said source for distribution to said units, said dielectric and said substratum being characterized by being lossy and formed of ferromagnetic material respectively, with the loss angle of the dielectric equal to or greater than the loss angle of the material of the substratum, permitting reduced amplitude and increased attenuation of said components to occur as the frequency of said resonant components increases.

4. The transmission line of claim 3, wherein said means for conducting said energy comprises a plurality of individual conducting strips electrically insulated from each other and from said ground plane by said lossy dielectric, whereby said line can conduct a plurality of different levels of energy from said source for distribution to said units.

5. The transmission line of claim 4, wherein said substratum is of elongated shape, said dielectric is affixed substantially coextensively with the opposing faces of said substratum and said conductive strips comprise first and second strips each affixed to one of said faces, so that the strips are electrically insulated from each other and from said ground plane by said dielectric, whereby said line can conduct first and second levels of energy from said source for distribution to said units.

6. The transmission line of claim 4, wherein said substratum is of elongated shape defining opposing ends, said dielectric is affixed substantially coextensively with the surface of said substratum, and said plurality of conductive strips are spirally affixed in spaced successive relationship to each other from one end to the opposing end of said substratum so that each strip is spirally contiguous with the periphery of the dielectric at least once.

7. The transmission line of claim 6, and further comprising terminal means for distributing said energy from said strips.

8. A transmission line for distributing energy from a source to a plurality of units, said line having high inherent decoupling characteristics for reducing the amplitude and attenuating the resonant signal components of said energy, comprising an elongated substratum defining opposing ends for serving as a ground plane for said line and of a thickness sufficient to support said line, a dielectric affixed substantially coextensively with the surface of said substratum, a first conductive strip affixed to one dielectric covered surface of said substratum substantially between said opposing ends, and a second conductive strip affixed to an opposing dielectric covered surface of said substratum, so that said strips are electrically insulated from each other and from said ground plane, said dielectric and said substratum being characterized by being lossy and formed of ferromagnetic material respectively, permitting the characteristic impedance of said line to decrease as the frequency of said resonant components increases, whereby reduced amplitude and increased attenuation of said components is achieved.

9. A transmission line for distributing energy from a source to a plurality of units, said line having high inherent decoupling characteristics for reducing the amplitude and attenuating the resonant signal components of said energy, comprising an elongated substratum defining opposing ends and of a thickness sufficient to support said line, said substratum serving as a ground plane for said line, a dielectric affixed substantially coextensively with the surface of said substratum, including the surfaces defining the thickness thereof, and a plurality of individual conductive strips affixed to said dielectric in spaced successive relationship to each other and extending from one end to the opposing end of said substratum, so that each strip is spirally contiguous with the periphery of the dielectric at least once, whereby said line can conduct a plurality of different levels of energy from said source for distribution to said units, said dielectric and said substratum being characterized by being lossy and being formed of ferromagnetic material respectively, so that as the frequency of said resonant components increases reduced amplitude and increased attenuation of said resonant components is achieved.

10. A transmission line for distributing a plurality of levels of energy from a source to a plurality of units, said line having high inherent decoupling characteristics for reducing the amplitude and attenuating the resonant signal components of said energy, comprising a substantially rectangular substratum of a thickness sufficient to support said line so as to define a common edge and three other edges, said substratum serving as a ground plane for said line, a dielectric affixed substantially coextensively with the surface of said substratum, said substratum also including a portion for making electrical connection thereto, and a plurality of individual conductive strips affixed to said dielectric in patterned spaced relationship, each of said strips originating at said common edge of said line and terminating at another of said edges, so that said line can conduct a plurality of levels of energy from said source for distribution to said units, said dielectric and said substratum being characterized by being lossy and being formed of ferromagnetic material respectively, so that as the frequency of said resonant components increases reduced amplitude and increased attenuation of said components is achieved.

11. In combination with a printed circuit board of the type adapted to retain electrical circuits and components with circuit connections thereamong, a transmission line for distributing a plurality of levels of energy to said circuits and components, said line having high inherent decoupling characteristics for reducing the amplitude and attenuating the resonant signal components of said energy, comprising a substratum of thickness sufficient to support said line for serving as a ground plane for said line, a dielectric affixed substantially coextensively with the surface of said substratum, means for maintaining said line in spaced parallel relationship to said board, so that said components and circuits may be disposed between said board and line, a plurality of individual conducting strips affixed to said dielectric in patterned spaced relationship to each other, so that said strips are electrically insulated from each other and from said ground plane, and means coupling said plurality of levels of energy from said strips to said components and circuits, said dielectric and said substratum being characterized by being lossy and being formed of ferromagnetic material respectively, so that as the frequency of said resonant components increases reduced amplitude and increased attenuation of said components is achieved.

12. The combination of claim 11, wherein the thermal path from said strips through said dielectric to said substratum has a low thermal resistivity, and the components are connected directly to said strips, whereby heat generated by said components is conducted through said dielectric to said substratum, said substratum serving as a heat sink.

References Cited by the Examiner
UNITED STATES PATENTS

| | | | |
|---|---|---|---|
| 2,773,239 | 12/56 | Parker | 174—68.5 |
| 2,923,860 | 2/60 | Miller | 174—68.5 |
| 2,943,956 | 7/60 | Robinson | 174—68.5 |
| 2,974,284 | 3/61 | Parker | 174—68.5 |

OTHER REFERENCES

Harvey: "Parallel-Plate Transmission . . . Frequencies," published in The Institution of Electrical Engineers, Paper No. 2770E, Part B, vol. 106, March 1959, pages 129–140.

Reich: Microwave Theory and Techniques, New York, Van Nostrand Co., Inc., 1953, TK R4 (page 142 relied on).

Rymeszewski et al.: DC Power Distribution System, IBM Technical Disclosure Bulletin, vol. 5, No. 2, July 1962, page 29.

HERMAN KARL SAALBACH, *Primary Examiner.*